April 28, 1931.  A. M. CRAIG  1,802,909
INTERLOCK FOR GEAR SHIFT SLIP RODS
Filed Dec. 10, 1926
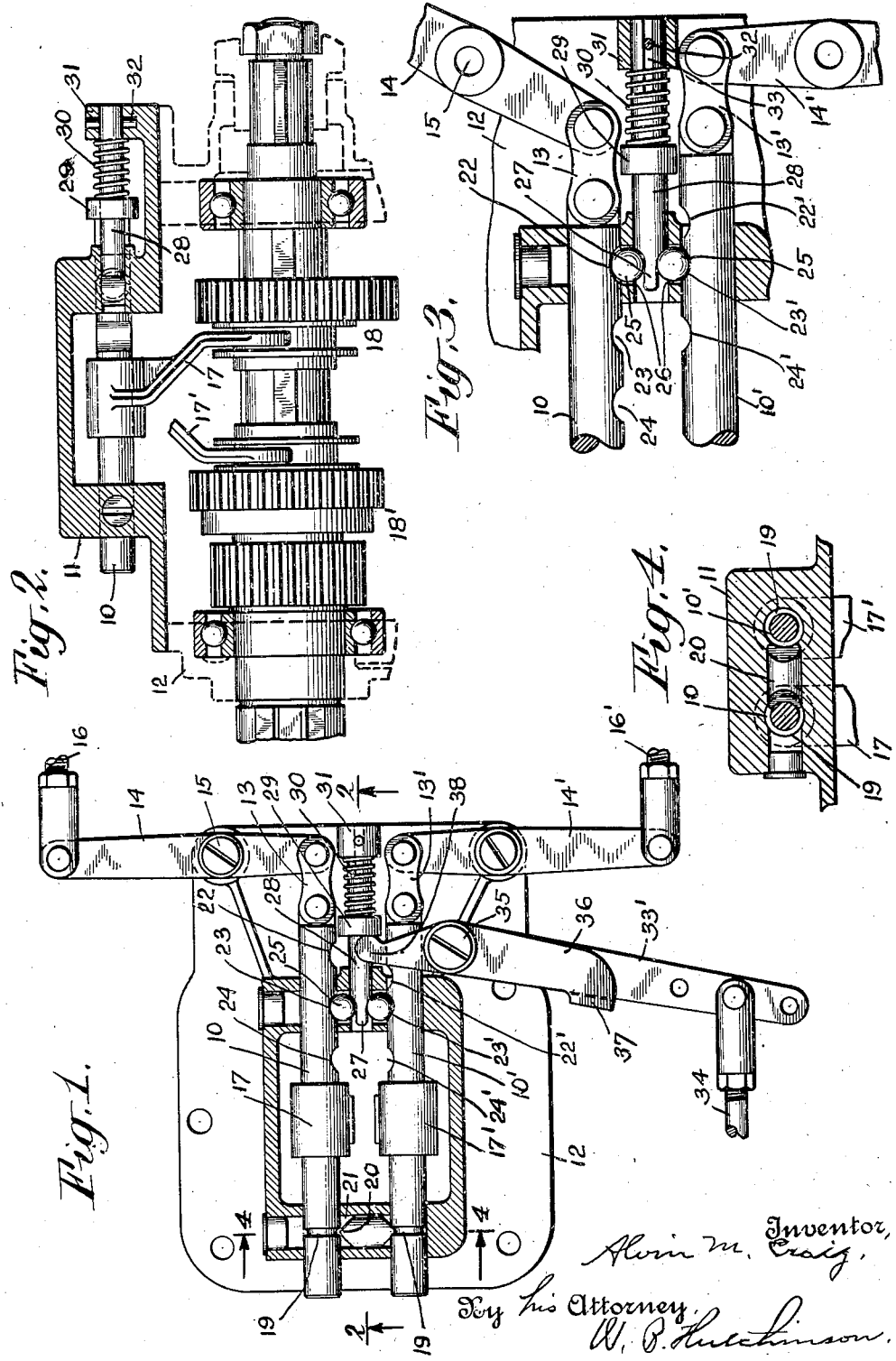

Patented Apr. 28, 1931

1,802,909

UNITED STATES PATENT OFFICE

ALVIN M. CRAIG, OF NEW HAVEN, CONNECTICUT, ASSIGNOR TO UNIVERSAL GEAR SHIFT CORPORATION, A CORPORATION OF DELAWARE

INTERLOCK FOR GEAR-SHIFT SLIP RODS

Application filed December 10, 1926. Serial No. 153,797.

My invention relates to improvements in means for locking power operated gear shift slip rods to prevent the rods from being moved at the wrong time, and to enable the gear shifting mechanism to be perfectly controlled without danger of accident or mistake. The invention can be used to advantage in connection with a gear shift mechanism such as described in my application for Letters Patent of the United States Serial No. 107,592, filed May 8th, 1926, although the invention is not limited to such particular use. Where gear shifts are moved by power operated slip rods connecting with shifting gears, there is always danger that the wrong rod may be used, or that either rod may be wrongly operated. My invention is intended to obviate these difficulties, and to enable the power operated gear shift slip rods to be even more accurately and safely controlled than they would be if directly manipulated by hand. My invention is intended to produce slip rods operated by power and in spaced relation which will move the gear shifts as desired, subject to control of the mechanism which forms no part of this invention, and which will permit either slip rod to be moved when in neutral position, but will act when one slip rod is moved to automatically lock the other rod against any possible movement. My invention is also intended to provide in connection with the automatic lock above referred to a second releasable lock which is under manual control, and which will automatically lock the slip rods in their relative operative positions, but will be released by the operation of the foot clutch or equivalent lever so as to free the slip rods and leave them to their functional movements. This secondary lock is also preferably arranged so that in shifting from one position to the other the slip rods will in every instance pass through the neutral position, thus further safeguarding the wrong movement of the rod in case of confusion, accident or mistake of the operator. The secondary lock operates automatically to hold the slip rods in the particular position in which they are placed, but can be readily released so as to leave them to the movement of their impelling mechanism.

The drawings illustrate the manner in which the invention has actually been made and used, but even so they are by way of example, and obviously the parts can be modified to a considerable extent without affecting the principle of the invention.

Reference is to be had to the accompanying drawings forming a part of this invention, in which similar reference characters indicate corresponding parts in all the views.

Figure 1 is a sectional plan of the upper part of a gear case showing the gear shifting slip rods in neutral position.

Figure 2 is a broken sectional elevation on the line 2—2 of Figure 1, showing some of the shifting gears.

Figure 3 is a broken enlarged detail view in sectional plan of the end portion of the shifting mechanism and with the slip rods moved from neutral position, and Figure 4 is a section on the line 4—4 of Figure 1.

The slip rods 10—10' are arranged in parallel relation as shown, and as illustrated they are held to slide in the top extension 11 of the gear case 12 which is conventionally illustrated, and as shown the slip rods 10—10' are connected and moved by links 13—13' which form a pivotal connection with the oscillating levers 14—14', these being pivoted as shown at 15 on the top of the gear case 12, although they might be supported in any convenient way. The levers 14—14' connect to rods 16—16' which are moved from a source of power, as for example the manner indicated in my prior application above referred to.

The slip rods 10—10' carry shifting forks 17—17' which are shown in Figure 2 connecting with sliding gears 18—18' of a conventional character. Obviously the shifting gears may be of any usual or preferred arrangement, and it will be observed that one slip rod 10 operates a portion of the gears, and the second rod 10' serves to move the other gears.

In Figure 1 the slip rods are shown with the forks 17—17' and their connected gears in neutral position. When in this position the rods 10—10' are positioned so that either can be moved freely, but after either is moved, the other is locked positively against movement by the drift block 20 which lies in the recess or way 21 between the two rods, and the widened portion of the block registers with the reduced parts or grooves 19 in the slip rods. Either rod can therefore be moved because the widened part of the drift block will enter the recess of one and permit the moving of the other, but after one of the rods has been moved lengthwise in either direction, the drift block will engage one groove 19, but will ride on the surface of the second rod so that the latter can move freely, but the one which is engaged by the block will be immovable, and it will be seen from the description that follows that before the operative position of either rod can be changed, the rod must be moved back to neutral position. This is important as helping to prevent any accidental shifting of the gears.

To fix the rods in their operative position a second lock is used which is manually releasable, and to this end the rod 10 is provided with recesses 22, 23 and 24, and the rod 10' with corresponding recesses 22', 23' and 24'. These recesses are engaged by balls 25 or analogous rolling locking members which are held in races or ways 26, and they are normally pressed into the recesses opposite them by the wedgelike end 27 of the slide block 28 which is suitably guided and is pressed or biased to enter between the members 25 and force them into the recess which may come opposite. To provide for this the slide block has a collar 29 thereon which is pressed by the spring 30 arranged between the slide block and a bearing lug 31 in which the block 28 is held to move. The slide block is held against turning in some suitable way so that the wedge part 27 will enter properly between the locking members 25, and as shown a pin 32 is placed in the lug 31 and in a groove 33 (see Figure 3) of the slide block.

Obviously any suitable means might be used for pushing back the slide block against the tension of its spring, but in the particular application which I have made of the lock, the slide block is movable against the spring by a lever 33' which I have shown pivoted in the ordinary way as at 35, and provided with a connecting rod 34 adapted to connect in a conventional manner with the releasing clutch of the machine, as the clutch has to be released whenever the car is started. On the same pivot is mounted a dog 36 having a lip 37 overlapping the lever 33' and having one end 38 in contact with a collar 29. Thus when the lever 33 is moved, as in starting the car and releasing the conventional clutch, the slide block is moved back against the tension of its spring, releasing the locking member 25 and freeing the slip rods 10—10' to the action of their motive power. When the slide blocks are moved, however, to correspond to the position at which the shift gears are to be fixed, the locking members 25 will enter the appropriate recesses and hold the slip rods against further movement until the slide block is again pushed back to release them.

In Figure 1 it will be seen that the slip rods are in neutral position as already explained, and the lock members 25 are consequently in the recesses 23 and 23', thus locking the slip rods. In Figure 3, however, one of the slip rods 10 has been moved to first position, and therefore the locking members 25 are in the neutral recess 23' of one member 10', but in the first position recess 22 of the slip rod 10. The rod 10' is locked by the drift block 20 and by the balls 25, and if the rod 10' is to be moved to another position so that the recess 24 is opposite the locking balls, it must first pass through the neutral position, to wit, that represented by the recess 23. Likewise if the rod 10' is moved it will be noted that one position is represented by the recess 22' and the other by the recess 24', so that in shifting it to either of the operating positions, it must first pass through the neutral position.

Thus it will be seen that I have provided a very simple but positive automatic lock for slip rods of this character which locks one rod positively when the other is out of neutral position, and a secondary lock which locks either rod in its operative position, and that in any event either rod must be moved to neutral position before changing the gear.

I claim:—

1. An interlock for motor car gear shifting slip rods comprising a pair of spaced parallel power actuated slip rods having opposed complementary recesses corresponding to the several positions of the slip rods and with the recesses representing the neutral position of the slip rods located between the other recesses, a pair of movable members between the slip rods adapted to fit in the aforesaid recesses, a spring pressed slide block acting to move the said members into said recesses, a pivoted lever, and a dog operated by the lever when the latter is moved in one direction only and acting when thus moved to release the slide block from the said movable members.

2. In combination with a gear shift transmission, an interlock comprising a pair of spaced parallel power actuated slip rods located directly above the gear mechanism and operatively connected thereto, said rods having recesses in their adjacent sides corresponding to the several positions of the slip rods, locking members between the slip rods and in the same plane movable into engagement with the recesses of the slip rods, power transmitting levers moving in substantially the same plane as the slip rods and pivotally connected thereto, a wedging slide block movable between the said locking members, and in the same plane as the slip rods, and a releasing lever pivoted to move in substantially the same horizontal plane as the slip rods and slide block, and acting to engage the slide block.

In testimony whereof I have signed my name to this specification this 8th day of December, 1926.

ALVIN M. CRAIG.